(12) United States Patent
Krug (10) Patent No.: US 9,018,781 B2
(45) Date of Patent: Apr. 28, 2015

(54) METHOD AND SYSTEM FOR ADAPTING THE LOAD ON AN ELECTRICAL AND/OR ELECTRONIC COMPONENT IN A WIND TURBINE

(75) Inventor: Florian Krug, München (DE)

(73) Assignee: Siemens Aktiengesellschaft, München (DE)

( * ) Notice: Subject to any disclaimer, the term of this patent is extended or adjusted under 35 U.S.C. 154(b) by 91 days.

(21) Appl. No.: 13/817,559

(22) PCT Filed: Aug. 19, 2011

(86) PCT No.: PCT/EP2011/064270
§ 371 (c)(1),
(2), (4) Date: Feb. 19, 2013

(87) PCT Pub. No.: WO2012/022797
PCT Pub. Date: Feb. 23, 2012

(65) Prior Publication Data
US 2013/0147195 A1    Jun. 13, 2013

(30) Foreign Application Priority Data
Aug. 20, 2010  (EP) .................................... 10173530

(51) Int. Cl.
*H02P 9/00*   (2006.01)
*F03D 11/00*  (2006.01)
*G01K 1/02*   (2006.01)

(52) U.S. Cl.
CPC ............ *H02P 9/006* (2013.01); *F03D 11/0091* (2013.01); *G01K 1/022* (2013.01); *Y02E 10/722* (2013.01)

(58) Field of Classification Search
USPC ........................................................ 290/44
See application file for complete search history.

(56) References Cited

U.S. PATENT DOCUMENTS

| | | | | |
|---|---|---|---|---|
| 7,143,007 | B2 * | 11/2006 | Long et al. ..................... | 702/184 |
| 7,955,045 | B2 * | 6/2011 | de Place Rimmen ............. | 415/1 |
| 8,116,990 | B2 * | 2/2012 | Koul ............... | 702/34 |
| 8,249,852 | B2 * | 8/2012 | Thulke ............................ | 703/18 |
| 8,279,072 | B2 * | 10/2012 | Peck et al. ...................... | 340/588 |
| 2008/0140349 | A1 * | 6/2008 | Behera et al. ................. | 702/182 |
| 2009/0231147 | A1 | 9/2009 | Larsson et al. | |
| 2011/0106510 | A1 * | 5/2011 | Poon ................................. | 703/2 |

FOREIGN PATENT DOCUMENTS

| | | |
|---|---|---|
| CN | 201332277 Y | 10/2009 |
| DE | 102005033229 A1 | 1/2007 |
| EP | 2031948 A2 | 3/2009 |
| GB | 2361064 A | 10/2001 |
| WO | WO 2008145275 A1 | 12/2008 |

* cited by examiner

*Primary Examiner* — Michael Zarroli (57) ABSTRACT

A method and system for adjusting the stress on an electrical and/or electronic subassembly in a wind turbine. The method allows determining for the electrical and/or electronic subassembly an expected service life up to the point when a maintenance indicator value is reached, which represents a state of the subassembly at which, on the basis of conditions defined in advance, the subassembly should be maintained. The method further allows comparing the expected service life against the time point for the next maintenance of the wind turbine and controlling the wind turbine and/or at least one other wind turbine in an area around the wind turbine in such a way that the stress on the electrical and/or electronic subassembly is reduced.

17 Claims, 6 Drawing Sheets

METHOD AND SYSTEM FOR ADAPTING THE LOAD ON AN ELECTRICAL AND/OR ELECTRONIC COMPONENT IN A WIND TURBINE

CROSS REFERENCE TO RELATED APPLICATIONS

This application is the US National Stage of International Application No. PCT/EP2011/064270, filed Aug. 19, 2011 and claims the benefit thereof. The International Application claims the benefits of European application No. 10173530.6 EP filed Aug. 20, 2010. All of the applications are incorporated by reference herein in their entirety.

FIELD OF INVENTION

The present invention relates to a method for adapting the load on an electrical and/or electronic subassembly, in particular a converter, in a wind turbine. In addition, it relates to a system for adapting the load on an electrical and/or electronic subassembly, in particular a converter, in a wind turbine.

BACKGROUND OF INVENTION

Because of the particular location where they are used, which is mostly arranged within the machine housing (also referred to as the nacelle) of the wind turbine, electrical and/or electronic subassemblies in wind turbines, for example converters (also called inverters), are exposed to exceptionally harsh environmental conditions. In particular, they are subject to severe vibrations from the wind and the operation of the rotors, together with high temperature fluctuations due to irregular operating cycles and because of the rapidly changing external temperatures, where these changes have in addition large amplitudes. This applies for both their operation in offshore wind turbines and also in onshore wind turbines, while in the case of offshore operations there are additional factors which have an influence, such as the more frequent occurrence of storms and the associated (salt-containing) spray, which further aggravate the environmental conditions. In sum, this means that electrical and/or electronic subassemblies of this type are subject to severe wear and tear, even though they are mostly arranged in the shrouding of the machine housing.

At the same time, an unexpected failure of a single such electric and/or electronic subassembly in a wind turbine implies very high outlay on additional maintenance deployments and costs. For this reason, the objective is generally to maintain such subassemblies, for example as part of regular maintenance work, by a regular program of replacements, so that a failure does not occur suddenly and unexpectedly, by which means additional downtimes can be avoided.

It is correspondingly important to provide highly-reliable options for correctly estimating a time point for maintenance, in order to be able to react early enough, that is before the electrical and/or electronic subassembly fails. Presently, the monitoring of subassemblies consists mainly of pure fault monitoring, i.e. an indication is given when a subassembly has already failed. In order to deal with such outages, the maintenance intervals are in addition deliberately kept very short, and to be safe it is preferred that a subassembly is replaced prematurely. This in turn brings the consequence that the material and labor usage in relation to these electrical and/or electronic subassemblies is generally higher than would actually be technically necessary.

Even if such a maintenance time point is accurately determined, the problem still remains that this maintenance time point can be even before a time point for maintenance at a planned maintenance interval, i.e. that the subassembly is expected to fail even before maintenance staff next arrive at the wind turbine. This means that staff must be sent out to the wind turbine prematurely, i.e. outside the maintenance cycle, in order to undertake unplanned maintenance, which is associated with corresponding additional cost.

SUMMARY OF INVENTION

It is therefore the objective of the invention to optimize the operation of electrical and/or electronic subassemblies in wind turbines, in particular to ensure as far as possible that the subassemblies do not fail prematurely, i.e. before a routine maintenance time point.

This objective is achieved by the features of the independent claim(s).

Accordingly, a method of the nature mentioned in the introduction inventively incorporates at least the following steps:
  determination of an expected service life for the electrical and/or electronic subassembly up to the point when it reaches a maintenance indicator value, which represents a state of the subassembly at which the subassembly should be maintained because of previously defined conditions,
  comparison of the expected service life with the next time point for maintenance of the wind turbine,
  controlling the wind turbine, and/or at least one other wind turbine in the area around the wind turbine, in such a way that the stress on the electrical and/or electronic subassembly is reduced.

Here, the wind turbine will preferably be controlled as a function of the results of the comparison of the expected service life against the time point for the next maintenance of the wind turbine.

The inventive method achieves the effect that the service life of the subassembly concerned is optimized to the effect that it still functions up to the time point of the next maintenance. The background to this is that it implies less effort and cost to reduce the performance of the wind turbine, and thereby to reduce the current yield, than to risk a total failure of the wind turbine before this maintenance time point, or to send maintenance staff to the site prematurely. This applies to onshore systems, but particularly so for offshore systems, which are simply significantly more difficult and expensive to get to than the former.

So, as the first step the service life which is to be expected (i.e. is expected) is determined, and from this are deduced a number of control commands which help directly, but preferably indirectly, to reduce the stress on the subassembly concerned. A direct reduction in the stresses can be achieved, for example, by simply switching off the subassembly concerned. Examples of an indirect reduction in the stresses are dependent on the nature of the subassembly—several exemplary embodiments specific to a converter are explained below.

As a guide variable in the method, use is made of the so-called maintenance indicator value. This maintenance indicator value represents a state of the subassembly at which the subassembly should be maintained because of previously defined conditions. Such predefined conditions include, for example, values based on experience, norms or other similar regulations. The term maintenance is to be understood as both a replacement of the complete subassembly or of components of the subassembly, but also a repair or a thorough investigation of the subassembly, as appropriate. If one compares this maintenance indicator value with the actual state of the subassembly, this gives the expected service life of the subassembly, which will subsequently be used, in the inventive sense, to control the wind turbine or surrounding wind turbines, as appropriate. By this means, control which depends on the state of the subassembly is achieved, thus selectively protecting the subassembly and so ultimately effecting an extension of the service life of the subassembly.

The description 'wind turbines in the area around the wind turbine concerned' designates all those wind turbines which have a spatially close functional interrelationship with the particular wind turbine concerned whose subassemblies are to be protected. These are therefore, in particular, other wind turbines within a wind farm, preferably indeed those which are sited in the directly adjacent neighborhood of the wind turbine concerned, which can for example partially place it in a lee.

An inventive system of the type mentioned in the introduction incorporates at least:
- a determination unit which, in operation, determines for the electrical and/or electronic subassembly an expected service life up to the point when a maintenance indicator value is reached, which represents a state of the subassembly at which the subassembly should be maintained because of previously defined conditions,
- a comparison unit which is so designed that it compares the expected service life with the next time point for maintenance of the wind turbine,
- a control unit which controls the wind turbine, and/or at least one other wind turbine in the area around the wind turbine, in such a way that the stress on the electrical and/or electronic subassembly is reduced.

Since the method can be carried out within the system, that is the stress adjustment system, both by hardware and also with the help of software components or by a combination of hardware and software, as appropriate, the invention also encompasses a computer program product which can be loaded directly into a processor of a programmable stress adjustment system, with program code facilities for carrying out all the steps of a method in accordance with the invention when the program product is executed on the stress adjustment system.

Further particularly advantageous embodiments and developments of the invention are given by the dependent claims together with the description which follows. Here, the inventive method can also be developed correspondingly as in the dependent claims for the determination system, and vice versa.

As far as the determination of the expected service life is concerned, this will preferably include at least the following steps:
a) determination of a present stress indicator value for the electrical and/or electronic subassembly,
b) making a comparison of the present stress indicator value with the maintenance indicator value,
c) deduction of the expected service life on the basis of the relationship between the stress indicator value and the maintenance indicator value.

In addition to the provision of the maintenance indicator value, the stress indicator value is thus determined as an orientation variable. It represents the present state of the subassembly. Whereas, until now, in determining the stress indicator value the usage time has generally been simply cumulated for an electronic subassembly, it is preferred if use is made of more precisely refined measurement or determination methods, which supply a more accurate stress indicator value, namely a state-dependent value. Preferred methods of determining this will be explained below.

So the two values are compared to each other, and from this the expected service life is deduced.

In order to achieve the most ideal possible result from the stress adjustment, it is very particularly preferred that the determination of the expected service life and the control actions are repeated in a closed control loop until the stress on the electrical and/or electronic subassembly has been so far reduced that the expected service life is extended at least until the next maintenance time point. Thus "closed loop" control is realized, with the result that the service life of the subassembly is not merely slightly extended, but is extended in a target-oriented way so far that it lasts even beyond the next maintenance time point, and maintenance can be effected as part of regular maintenance operations. The closed control loop achieves the effect that readjustments continue to be made until the desired service life result can be reached.

The control actions can make use of two alternative or complementary variants (apart from possibly switching off the subassembly, as already mentioned above):

The first variant consists in controlling the wind turbine itself, by adjusting a rotor on the wind turbine in relation to a present wind direction, and/or the position of at least one rotor blade of the rotor, in such a way that the rotor reaches a speed of rotation which is less than the maximum possible under the wind conditions.

So, for example, by azimuthal control the wind turbine is set into the wind in such a way that the energy yield of the wind turbine is specifically suboptimal, i.e. is reduced. Less kinetic energy is effective on the system, in particular also on its electrical or electronic subassemblies, which leads to a reduction in the stress. In the case of wind turbines, the term azimuth is used for everything that has to do with the horizontal tracking of the wind by the nacelle. The azimuth system is used to adjust the orientation of the nacelle, and consists of azimuthal bearing, azimuth drive, azimuth gearing and azimuth controller. The azimuth drive consists of multistage planet gears, which are driven by frequency controlled electric motors. Instead of, or in addition to, appropriate azimuthal control, it is also possible to effect a suitable resetting of the rotor blades on the rotor, again to reduce the energy yield. For this purpose, actuators for the control of the azimuth or rotor blades are instructed to carry out the appropriate positional changes for the elements which are thereby affected.

The second variant consists in selectively operating the other wind turbines in such a way that the wind turbine comes to a greater extent than necessary into a lee of the other wind turbines. So an intentional and selective sheltering of the wind turbine concerned is effected by the orientation of the other wind turbine(s), with the effect of reducing the wind on the rotor of the wind turbine concerned, and thereby again reducing indirectly the stress on the subassembly concerned.

The present stress indicator value will preferably be determined on the basis of temperature measurements in an area around the electrical and/or electronic subassembly. Preferably this will be effected automatically, that is to say with the help of autonomous evaluation algorithms or systems, as applicable, as part of a process for which no human input is essentially required in regular operation.

Whereas, in determining stress indicator values, the usage time is generally simply added up for an electronic subassembly, this form of embodiment departs from a purely time-based view of this type, and puts the focus on another influencing variable: the temperature curve to which a subassembly is exposed affects its ageing particularly strongly, especially in the case of wind turbines: individual components of such electrical or electronic subassemblies, for example chip elements, are in contact with one another via permanent joints, for example glued or soldered joints. Thus, for example, several semiconducting elements such as IGBT modules (Insulated Gate Bipolar Transistors) in an IGBT converter, are glued, crimped or soldered onto a mounting substrate, such as a circuit board. These permanent joints between circuit board and modules are exposed to strong shear stresses due to the constant temperature changes in the wind turbine. Namely, when heated the individual components expand differently, in general more, than does the mounting substrate, so that tensions build up in the joint between the two.

The form of embodiment now makes use of the fact that such tensions in the subassembly are cumulative, and so lead to material fatigue at the joints between the individual components of the subassembly, with the effect that it is generally a breakage of such a joint which leads to the failure of the subassembly. The inventor has thus accurately identified the important cause of the critical fatiguing phenomena for electrical and/or electronic subassemblies in wind turbines, and from this has derived as a logical consequence the method for determining an appropriately accurate or representative stress indicator value for the electrical or electronic subassembly.

The accumulation of stress values is known per se from material science, namely from the investigation of material fatigue symptoms. So, for example, stresses due to tensions or loads on mechanical components of machines are determined and accumulated. There is however a critical difference between the approach in the case of the investigation of determinations in individual materials as against the requirements in the present case, in that electrical or electronic subassemblies are made up of numerous individual components and therefore it is not obvious that the factor which is decisive for fatigue really is the temperature (curve) to which the subassembly is exposed. It has thus surprisingly turned out that the method proposed here is significantly better suited to representing the stresses on an electronic element in a wind turbine than, say, a calculation purely based on operating times. Because this would be the natural assumption if one could indeed start from the basis that it is not the joints which are the weakest element in the subassembly but rather the individual functional components, i.e. the electronic modules. Although one can probably also start from this assumption in the context of common electronic applications, in relation to wind turbine applications it has been found that the extreme temperature fluctuations weaken the subassemblies so significantly that other ageing factors play a subordinate role.

In the field of wind turbines, this effect is to be seen not only in the case of the IGBT modules mentioned but also for example in the case of multi-layer capacitor blocks, transformers or generators. The ageing of galvanic systems such as batteries can also be modeled on the basis of this effect.

This method can also be put into effect without great additional expense, because temperature measurements in the wind turbine, in particular in the region of the power electronics in wind turbines, are in any case being made, so that it can be assumed that a sufficient number of temperature sensors are available, at suitable measurement locations, to be able to supply the necessary measured values. So all that is needed is appropriately adapted evaluation electronics, which deduce the stress indicator value from the measured temperature values, and if necessary pass on appropriate signals.

In principle it is possible to determine the stress indicator value even when the subassembly has already been in use in the wind turbine. So, for example, after a certain period in use an interim stress indicator value can be defined or, by using appropriate methods (for example, and preferably, the inventive ones) determined in retrospect and then updated with the help of the inventive method. However, it is preferred that the temperature measurements are carried out over the entire usage cycle of the subassembly in the wind turbine. This ensures that the stress indicator value is determined continuously with the help of the inventive method which, in particular, increases the rigor of the method of determination and thus the predictive capability of the results.

Here, it is particularly preferred that reference values are derived and accumulated from the temperature measurements, and the stress indicator value is formed on the basis of the accumulated reference values. Such an indicator value represents the accumulated reference values, preferably it incorporates them. The reference values can be both quantitative values derived from the temperature measurements and also numeric details, for example how many temperature cycles the subassembly has already gone through. The reference values then represent measured quantities which reflect numerically the wear or the fatiguing of materials in the subassembly or individual components of it, as appropriate. Here, the accumulation can comprise, for example, a simple addition of the reference values, but it can also be non-linear in nature. The appropriate accumulation method can, in particular, be chosen to be dependent on the nature of the electrical or electronic subassembly and where it is used in the wind turbine.

The temperature measurements can made both continuously and also at regular intervals. The shorter these intervals are, or the more closely the temperature measurements approximate to a purely continuous method, so much more finely can the measurement results be assessed and then fed into the determination of the stress indicator value. On the other hand, it also suffices to make temperature measurements at regular intervals with adequate frequency, because it can be assumed that larger temperature cycles can nevertheless be relatively accurately modeled with the help of such a method, for example on the basis of quarter-hourly measurements or communication of the measurement results. The advantage of such a cyclic method consists in the fact that a smaller volume of measurement data has to be processed and so the transmission and processing rates can be reduced to the necessary minimum.

The reference values will preferably be based on temperature cycles in a temperature curve determined from the temperature measurements. The evaluation of this temperature-time curve, that is in particular the determination and the weighting of the temperature cycles, will then especially preferably be effected using evaluation algorithms such as are used in the field of material science, that is to say in the context of the investigation of material fatigue symptoms. Here, one possibility consists in making an evaluation and weighting on the basis of the Wailer curve, another method is based on the rules of Palmgren and Miner, who assume wear in the region of material fatigue is linear.

Alternatively or as an enhancement, the reference values will preferably be based on maxima and/or minima of a temperature curve determined from the temperature measurements. Such extreme values give indirect information about the highest temperature-related stresses the component has been subjected to, so that by taking into consideration the maxima or minima, as applicable, a particularly accurate conclusion about the wear of the subassembly becomes possible.

Furthermore, it is advantageous if the reference values are determined on the basis of over- and/or under-shoots of temperature threshold values which have been defined in advance. The over- or under-shoots, as applicable, can then simply be counted and fed into the accumulation as count values. Alternatively, the extent by which the temperature has overshot or undershot the chosen temperature threshold values can be made use of for the accumulation.

In this case the thresholds are used, for example, firstly to delimit temperature fluctuations which are effectively insignificant from those which play a substantial part in the wear of the subassembly. Secondly, with their help the reference values can be determined in a way which is simple, by comparison with those methods which basically refer to all the temperature-time curves for an accumulation. In particular, this saves on computational capacity.

It is, furthermore, also possible to set several threshold values, namely at least one threshold value, which means that a critical temperature threshold has been exceeded, and at least one threshold value which means that a critical temperature threshold has been undershot, together if necessary with other threshold values which can be referred to in evaluating the significance of the over- or under-shoots concerned.

So it is possible, for example, to set a first upper threshold value which triggers a single count pulse and a second threshold value which triggers an additional single count pulse, together with a third upper threshold value, the exceeding of which can be even more strongly weighted than a single count pulse. Analogous to this, it is also possible to set stepped lower threshold values.

As a simple method, as a part of such a threshold-based determination, the amounts of the over- or under-shoots, as applicable, can be simply added as part of the accumulation. In this case, the stress indicator value consists simply of the sum of the amounts by which the threshold values are over- or under-shot.

In order to recognize which stress indicator value a particular electrical or electronic subassembly has reached in the course of its usage, use will preferably be made of graphical display methods, with the help of which stress indicator values will be output to a user, for example an operator of a control computer in a control center. The present value of the stress indicator will then be output for the user graphically, preferably with the help of a scale and/or another form of graphical encoding. By this means, the user is given direct information on the basis of which a timely assessment can be made of the state of the subassembly, and as a consequence replacement actions can be initiated. Instead of a graphical display, an output can also be made using an audible means of output, for example a voice output. The output does not necessarily have to be at the location where the electrical or electronic subassembly is being used, but can also be passed over appropriate data transmission systems to a control center. It can also be presented in readable or audible form, as appropriate, near the entrance to the wind turbine tower, that is to say (for onshore systems) at a ground-level position or (for offshore systems) at a location at the level of the water surface.

In principle measurement of the temperature, based on the inventive method, can be made at numerous suitable places within or even outside the wind turbine. In particular, to further increase the accuracy of measurement, it is however preferable to make the temperature measurements using at least one temperature sensor which is attached at a position which is fixed relative to the subsystem and is in an area neighboring the subsystem. Such a neighboring area is defined by a distance from the subsystem within which it is to be expected that in the wind turbine's normal operating conditions the temperature determined there in ° Celsius deviates by at most 10% and preferably by at most 5%, and especially preferably by at most 2% from the temperature of the subsystem measured at the same time.

Such an arrangement of the temperature sensor means that it is possible to deduce particularly reliable measured values, which reflect the temperature curve for the subassembly in very fine detail. In spite of this, it does not generally imply additional expense, because temperature sensors are in any case permanently installed in wind turbines, so that these need only to be used simply in accordance with the invention, and if necessary to be suitably positioned. A further increase in the accuracy of measurement and the representativeness of the measured temperature values determined can be achieved in that a single temperature sensor is used which is attached at a central position relative to the subassembly, and is preferably joined to the subassembly. Such a central position can, for example, be on the central axis of the subassembly or a point of symmetry of the subassembly; it is especially preferred that the temperature sensor is arranged on, and advantageously also affixed directly onto, the subassembly, for example on a circuit board of the subassembly. This guarantees that the temperature measurement is made at the point where the temperature fluctuations lead practically directly to the wear of the subassembly; a fixing onto a circuit board or onto the subassembly itself, as applicable, guarantees in addition that the temperature sensor will not inadvertently, for example during vibrations of the subassembly, be pushed away from and then later back toward the subassembly, which would produce distortions in the temperature curve.

As an alternative to the arrangement of a single temperature sensor, it is also possible to use several temperature sensors, which are arranged at representative measurement locations in the region around the subassembly, preferably at measurement locations where values previously ascertained from experience show that particularly high local temperature fluctuations arise. Such experiential values can be obtained, for example, from appropriate knowledge systems (databases) or on the basis of separate measurements of the temperature fluctuations. The temperature sensors are then attached, in effect, at particularly critical places in the region of the subassembly. Appropriate attachment then in turn makes the predictive ability of the measured temperature values particularly high.

Because it has been recognized that it is indeed thermally generated stress which is particularly responsible for the ageing of the electrical or electronic subassemblies, it is also preferred in the context of the invention that cooling of the subassemblies is carried out, in particular at the joints between individual subassembly components. Such cooling can be effected both actively, such as using fans, and also passively, such as by cooling elements. In particular, it can be regulated as a function of the measured values determined by the temperature measurements so that, for example, particular temperature spikes are smoothed out, in order to prevent selectively more massive damage to the subassemblies.

Alternatively or as an enhancement to the determination of the stress indicator value on the basis of temperature measurements, provision can be made that the present stress indicator value is determined on the basis of the results of determinations from at least one of the following methods of determination:

Measurement of a salt content in the air—especially that observed over time (for example by the accumulation of salt values) in the region of the wind turbine: by observing the long-term value over time of the salt content in the air in the region of the wind turbine concerned it is possible to deduce wear values, for example for items of insulation or seals, and on the basis of this (if necessary in combination with a consideration of other factors) the stress indicator value can be formed.

Determination of wind profiles at the wind turbine and/or upwind of it: wind profiles in the region of the wind turbine (e.g. at a distance of 100 m in front of the wind turbine) can be determined, for example, by means of the familiar LIDAR systems. With the help of these, it is possible to deduce the present stress level over time, or a short-term wind forecast can be produced, from which the stressing effect which is to be expected in each case on the subassembly can be deduced, i.e. can be forecast.

Temperature measurement on electrical equipment in the other wind turbines: from the measured values thereby generated it is possible, using correlation functions, to determine a detailed and reliable forecast of the service life of the subassembly concerned, on which the stress is to be reduced.

Current fault measurements on the electrical and/or electronic subassembly: from these it is possible, for example, to detect and if necessary counteract leakage currents, such as those caused by insulation problems or overvoltages in the subassembly itself.

Vibration measurements on a drive train and/or a generator in the wind turbine: from these it is possible to obtain indicators of bearing problems, such as in generators, which again have a substantial influence on the ageing of electrical or electronic subassemblies.

The assessment of individual ones of these measurements or determination results, or all of them (including the temperature measurement results discussed at length above), can be summarized in one overall algorithm by means of a correlation function for the individual values (if necessary determined, for example accumulated, over a period of time). From this, the stress indicator value can be deduced. It is also possible here to use limit values for the individual parameters, rather analogous to what has been explained for temperature measurement. The algorithm can be designed to be self-learning, and hence can be set up when the wind turbine is put into service and can determine changes in the subsystem during ongoing operation by a comparison function.

Using a (preferably realized) display of the stress indicator value relative to the maintenance indicator value, a user can in addition determine rapidly and intuitively for how much longer or how many usage cycles, for example temperature cycles, the subassembly will with high probability still function, and when he will need to carry out maintenance. In other words, this permits a relatively accurate conclusion to be drawn in an uncomplicated and intuitive way about the relative service life of the subassembly.

This can in addition be made even easier in that the reference between the present stress indicator value and the maintenance indicator value is output to the user graphically, preferably with the aid of a scale and/or a graphical encoding. The advantages of a graphical output have already been mentioned, they are further increased by putting the two indicator values alongside each other.

BRIEF DESCRIPTION OF THE DRAWINGS

The invention is explained again in more detail below using exemplary embodiments, making reference to the attached figures. Here, the components which are the same in the various figures have been given identical reference numbers. The figures show.

DETAILED DESCRIPTION OF INVENTION

Figure 1:
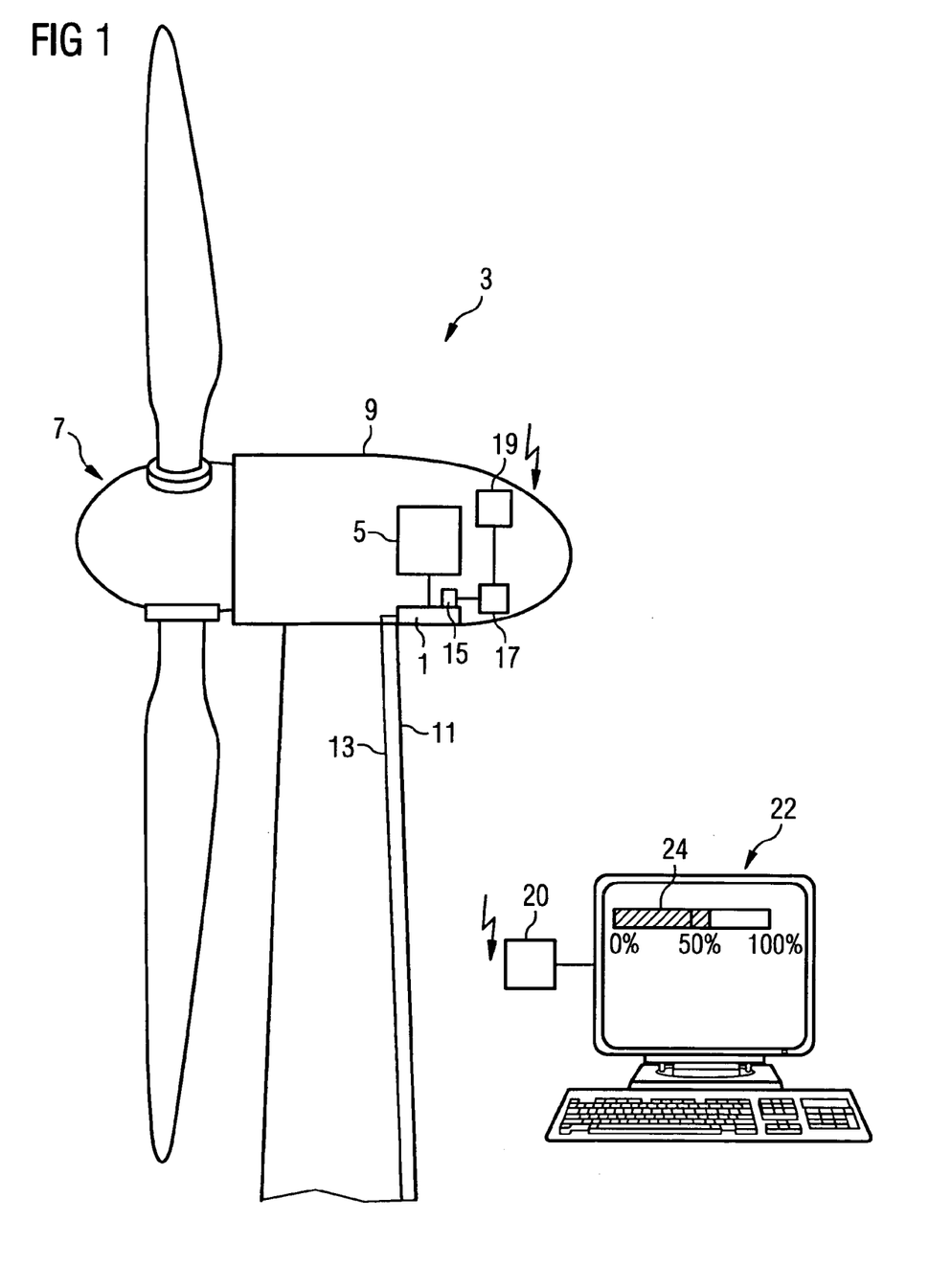
FIG. 1 a schematic block diagram of the sequence of activities in one form of embodiment of an inventive method, FIG. 2 a side view of a wind turbine with one form of embodiment of an inventive system, FIG. 3 a detailed schematic view of a subassembly arrangement with the same subassembly and the same determination system as in FIG. 2 together with a yet more detailed view of an individual module in the electronic subassembly, FIG. 4 three graphs showing the temperature, stress and service life against time for the electronic subassembly in FIG. 3, FIG. 5 a schematic block diagram of a system architecture, as realized in the subassembly arrangement shown in FIG. 3, FIG. 6 a schematic block diagram of a signal process, as part of one form of embodiment of the inventive method.

FIG. 1 shows a block diagram of the steps in a method in accordance with the invention for one form of embodiment. For this purpose, a determination step G (here split into three) determines for an electrical or electronic subassembly an expected service life up to the point when a maintenance indicator value is reached. When this maintenance indicator value, which is prescribed in advance, is reached, the assumption is made that the subassembly should be maintained.

The determination step G comprises three sub-steps A, B, C, namely:

a first step A in which a present stress indicator value is determined for the electrical and/or electronic subassembly, a second step B in which the present stress indicator value is compared against the maintenance indicator value, and a third step C in which the expected service life is deduced on the basis of the relationship between the stress indicator value and the maintenance indicator value.

In a step D, the expected service life is compared against the time point for the next maintenance of the wind turbine, on the basis of which selective counteractions are taken in accordance with two alternative steps E, F, in such a way that the stress on the subassembly concerned is reduced. This is effected in step E by controlling the wind turbine and/or in step F by controlling at least one other wind turbine in the area around the wind turbine concerned, as will be explained in more detail below by reference to FIG. 2.

Figure 2:
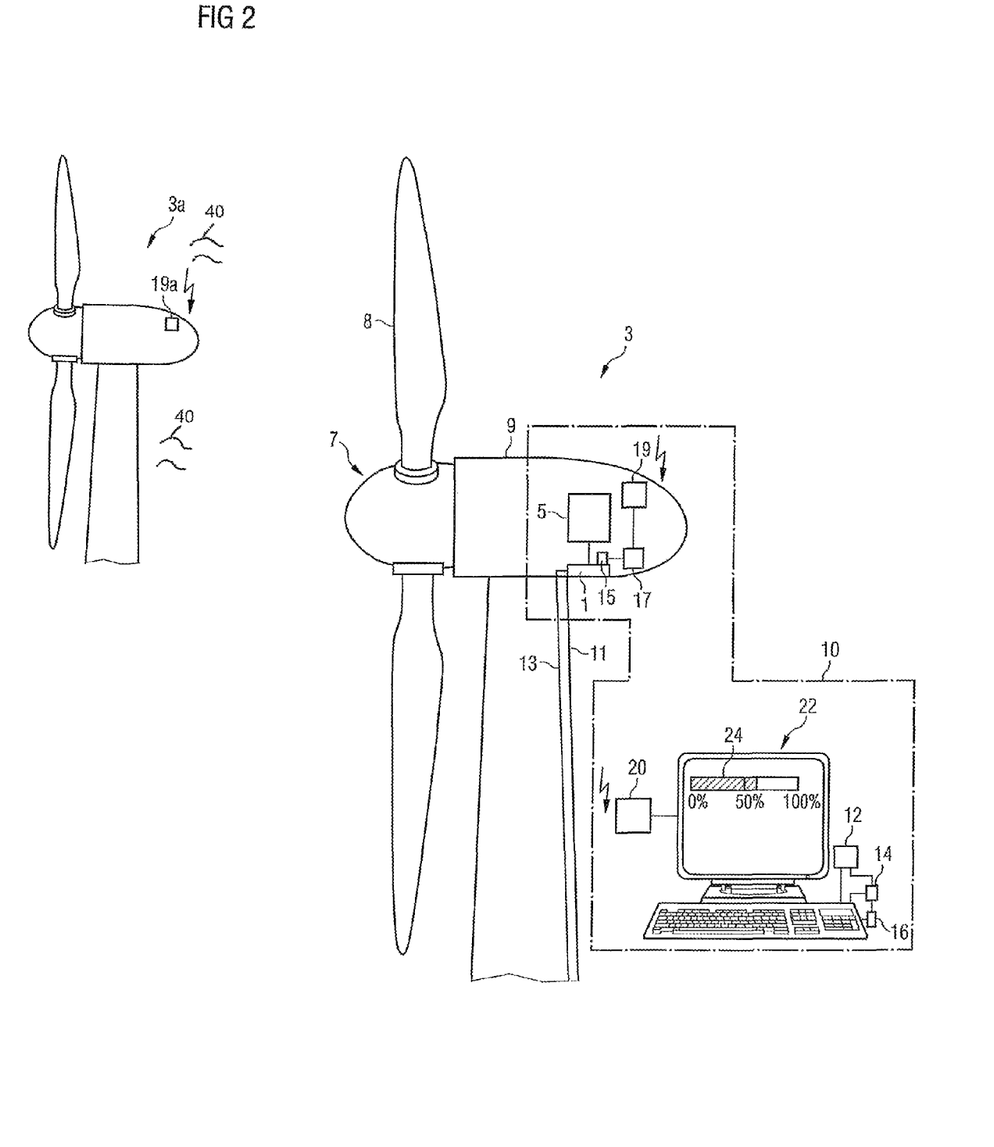

FIG. 2 shows a wind turbine 3 with a tower 11 on which a nacelle 9 is affixed in such a way that it can turn. A rotor 7 with rotor blades 8 is fixed on the front of the wind turbine 3, on the left-hand side, in such a way that it can turn, its wind-induced rotation being converted into electrical energy by a generator 5 in the nacelle 9. For the sake of clarity, the drive shaft and numerous other components in the transmission of the power from the rotational forces into the generator 5 are not shown here.

To convert the electrical energy from the generator 5 into a suitable form (in particular at a desired voltage and frequency) for transmission into the network, use is made of a converter or inverter 1, that is an electronic subassembly 1, which is connected via a current conductor 13 to the network (not shown). Attached to the converter 1 is a temperature sensor 15, which is linked to a determination system 17. From the determination system 17, signals are forwarded to a signal transmitter 19, which communicates these signals onward via a wire-free link to a receiving device 20 in a control center (not shown). There, the data transmitted by the signals is displayed graphically, in the form of a scale 24, on a screen 22 of a computer.

Also shown is a system 10 in accordance with the invention for adjusting the stress on the converter 1: apart from the temperature sensor 15, the determination system 17, the signal transmitter 19, the receiving device 20 and the screen 22, this incorporates three software components, implemented on a processor of a computer, namely a determination unit 12, a comparison unit 14 and a control unit 16.

Also to be seen, in the background, is another wind turbine 3a, also equipped with a signal transmitter 19a, which together with the wind turbine 3 is part of a wind farm.

The determination unit 12 determines an expected service life for the converter 1, as described in step G (cf. FIG. 1). The comparison unit 14 receives from the determination unit data about the expected service life, and compares this with the time point for the next maintenance on the wind turbine. This comparison data is received by the control unit 16, which deduces control commands from it. These control commands are passed on to the two wind turbines 3, 3a and have the effect, on the one hand in the wind turbine 3 that it is turned out of the wind, i.e. its rotor blades 8 and the nacelle 9 are repositioned so that the wind turbine 3 only processes a smaller amount of the kinetic energy, from the wind incident on the rotor 7 than is potentially possible.

This reduction in the kinetic energy is also reinforced by the fact that from the outset less wind is permitted to reach the wind turbine 3. This is effected by the control unit 16 also sending out control commands to the other wind turbine 3a, which have the result that the other wind turbine 3a puts the wind turbine 3 more greatly in its lee 40 than would normally be necessary, i.e. expected under full-load operation. The other wind turbine 3a is thus also realigned relative to the wind.

Figure 3:
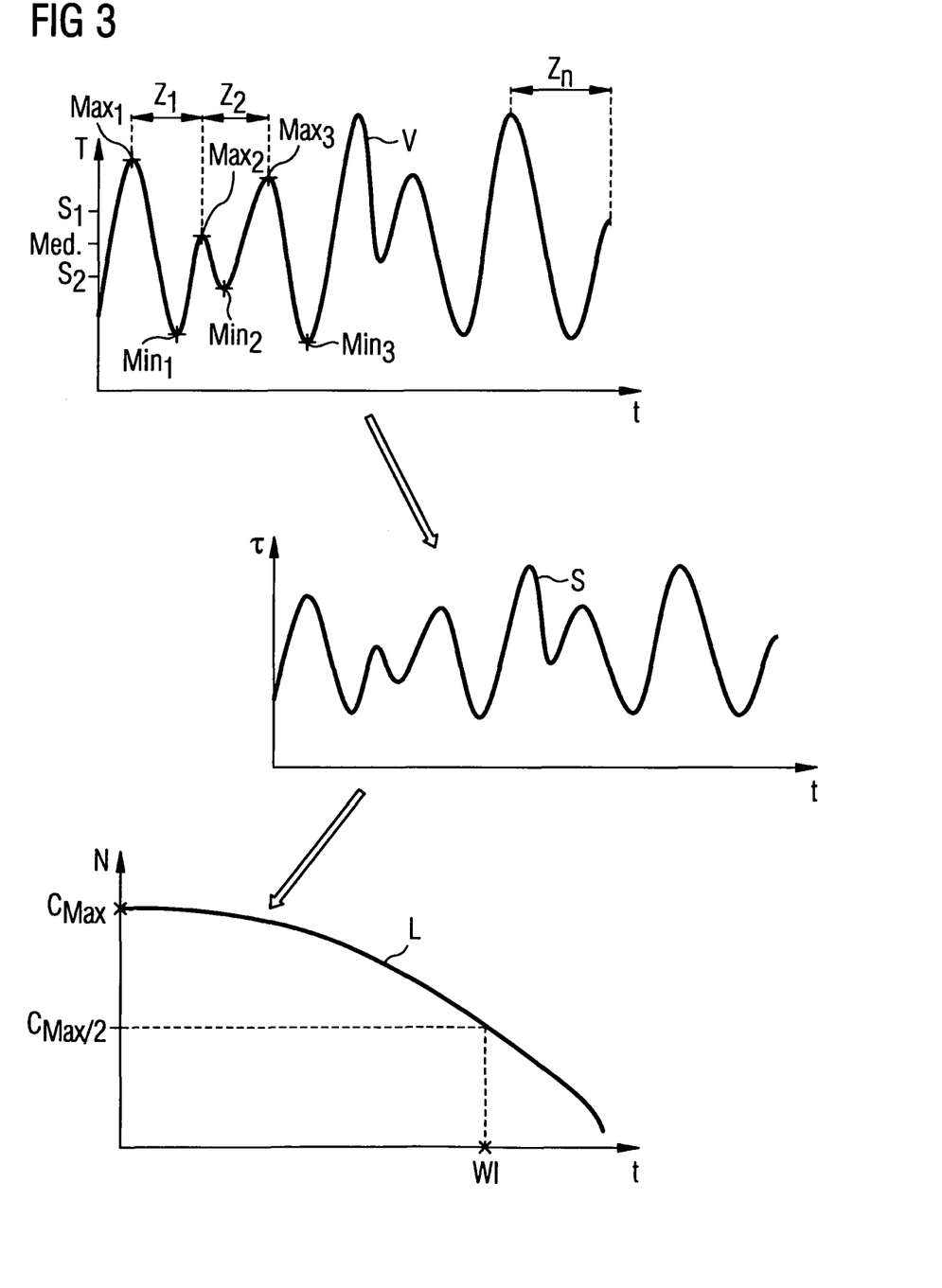

FIG. 3 shows a subassembly arrangement 37. This subassembly arrangement 37 incorporates the subassembly 1, that is the converter 1 and the determination system 17. The converter 1 incorporates a circuit board 25 on which are arranged, on each of two insulating layers 23, individual modules 21 in the form of IGBT semiconductor elements. The detail drawing on the lower right shows a single such individual module 21 on an insulating layer 23. It is joined to the insulating layer 23 by a joining layer 31, here an adhesive. If the subassembly 1 is exposed to strong heating, then the individual module 21 will expand more than the insulating layer 23. As a result, tensions develop, especially in the joining layer 31, so that it is precisely this joining layer 31 which in time suffers fatigue. Equally, conducting elements 27 which conduct signals or electric charges, as applicable, away from the individual modules 21 or to the individual modules 21, can also be thermally stressed in a similar way. For the purpose of determining a temperature curve, the temperature sensor 15 is arranged centrally on the subassembly 1, at a point of symmetry on the circuit board 25. From this temperature sensor 15, a link for transmitting the measured temperature values MW leads to the determination unit 17. The determination unit 17 has an input interface 29 and an output interface 35, together with an evaluation module 33, into which the measured values MW are fed in from the input interface 29. In the evaluation module 33, a stress indicator value BI is deduced in accordance with a predefined rule, for example an algorithm based on Wohler's curve. This stress indicator value BI is passed on via the output interface 35 to the signal transmitter 19 (cf. FIG. 2). As shown in FIG. 2, this stress indicator value BI can be output to a user graphically.

Figure 4:
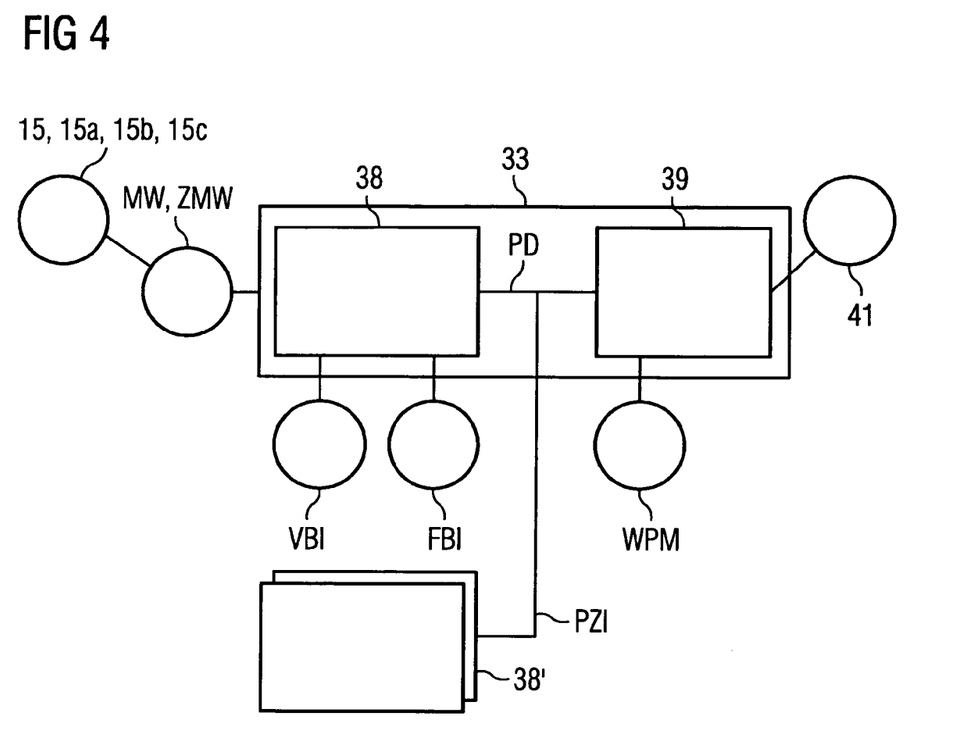

The underlying logic for this determination method based on temperature measurement at the subassembly 1 is apparent from the curves which are shown in FIG. 4. The first curve V is a temperature curve V, which shows the temperature measured at the temperature sensor 15 plotted against time. The temperature curve fluctuates with irregular movements about a statistical mean value Med, which represents the average temperature in the nacelle 9 of the wind turbine 3. In doing so it establishes maxima $Max_1$, $Max_2$, $Max_3$ and minima: $Min_1$, $Min_2$, $Min_3$. This produces cycles $Z_1, Z_2, \ldots Z_n$. In the course of these cycles $Z_1, Z_2, \ldots Z_n$, some sections of the curve V exceed an upper threshold value $S_1$ and some fall below a lower threshold value $S_2$.

The second curve S is a sheer stress vs. time curve S for the shear force between two layers in the subassembly 1, which arises because of the different expansion coefficients of these two layers. Here, the shear stress τ is also plotted against time. It can be seen that the curve of shear stress against time is analogous in form to the temperature curve V. From this is ultimately derived the remaining service life N against time, as shown below in the graph L of service life cycles against time. In the present instance, the service life cycles N are to be understood as the switching cycles N of the converter 1. So, in order to be able to quantify its remaining service life, a determination is made in parallel of how often the subassembly 1 will switch. The curve L of service life cycles against time shows the length of remaining service life which is to be expected for the subassembly 1 on the basis of the stresses from the shear loads or the stress from temperature fluctuations, as these emerge from the curve S of shear stress against time and the temperature curve V. The curve L of service life cycles against time is deduced with the assistance of a suitable logarithm for the purpose of determining material fatiguing. In its determination, use can be made of both the complete temperature curve V and also the mean value Med or similar average values, which emerge from the curve V. Equally, the maxima $Max_1$, $Max_2$, $Max_3$ and the minima $Min_1$, $Min_2$, $Min_3$ and the cycles $Z_1, Z_2, \ldots Z_n$ can be used for the evaluation, and/or over- or under-shoots of the threshold values S1, S2. In other words, the curve can be interpreted per se, and also additionally or alternatively derived results or mean values in the sense of trend analysis can be used.

In the present example, the curve L of life cycles against time formed in this way describes roughly the shape of an inverted parabola. At the start of use of the subassembly, it has available a maximum number $C_{Max}$, of life cycles N.

When half of the maximum number $C_{Max}$ of life cycles N of the subassembly 1 (i.e. $C_{Max}/2$) is reached then, in the present case, the maintenance indicator value WI is reached, which means that the subassembly 1 ought to be maintained for the sake of safety. This does not mean that the subassembly 1 is automatically to be discarded, but it can instead even be established that the subassembly 1 has withstood the stresses better than expected, or that it is only in need of repair in some sub-areas.

Figure 5:
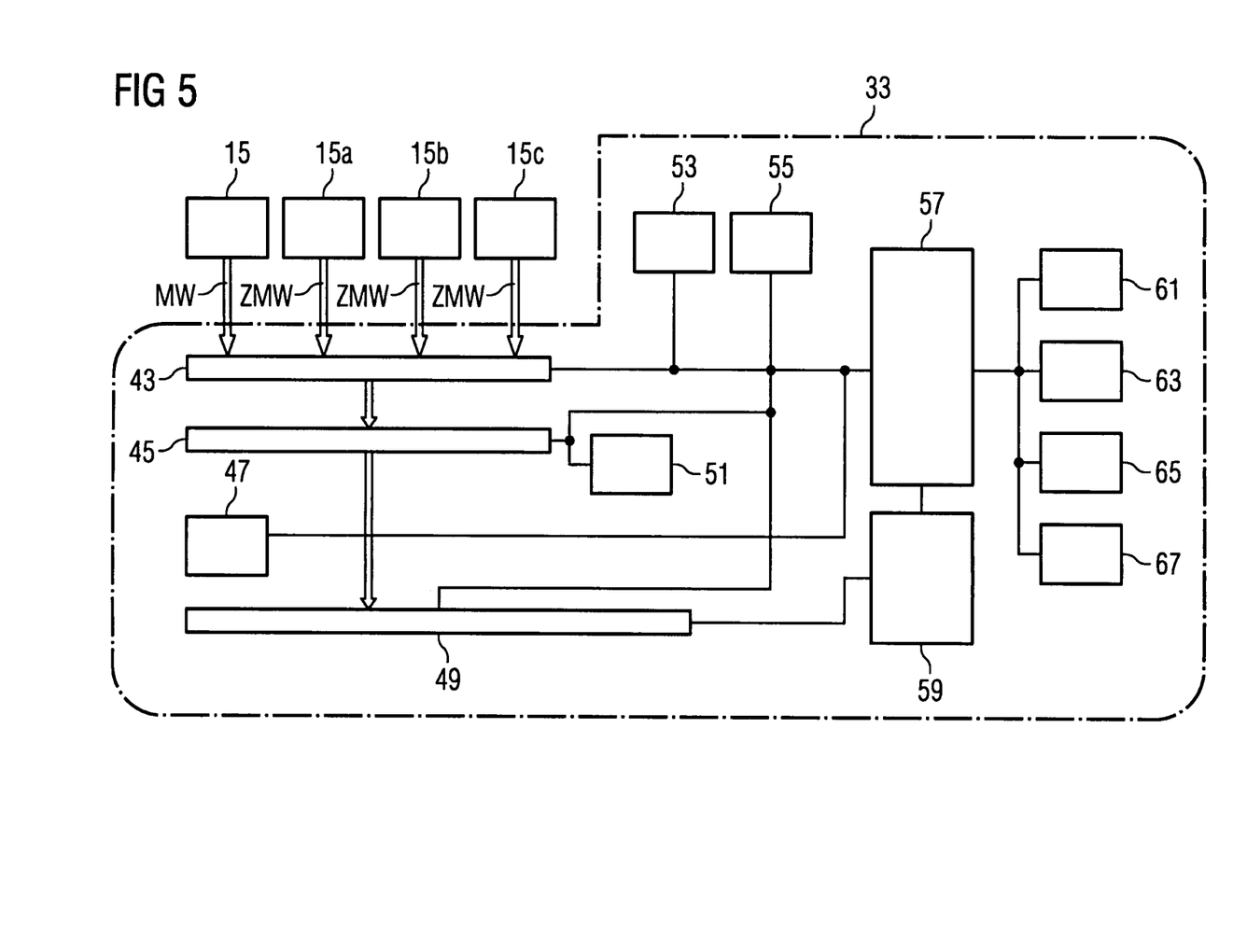

FIG. 5 shows a schematic block diagram of a system architecture such as is realized in the subassembly arrangement 37 in FIG. 3. Sensors 15, 15a, 15b, 15c (here shown as one unit) determine various measured values MW, ZMW: the temperature sensor 15 determines measured temperature values MW, while other sensors 15a, 15b, 15c determine additional measured values ZMW relating to load distributions in the wind turbine 3 and to mechanical tensions. These measured values MW, ZMW pass into a wind turbine control unit 38 within the evaluation module 33. In addition there is a service life monitoring unit 39 arranged in the evaluation module 33.

The wind turbine control unit 38 obtains in addition variable process data VBI from the operation of the wind turbine 3, such as the rotation speed of the rotor 7 or the power output of the wind turbine 3. These values can be measured by separate sensors, but can also be derived from other measured values. To these are added items of permanent operating data FBI, which relate to settings permanently made for the wind turbine 3, such as control parameters of the electronic subassembly 1 concerned, which are defined in advance and then are readjusted in operation only at intervals if at all. These data items pass for evaluation into the wind turbine control unit 38 and are there compared against each other to produce items of process data PD. In addition, in a wind farm with several wind turbines 3, 3a, supplementary items of process data PZI can be obtained from the wind turbine control units 38' of the other wind turbines, in an analogous way to the process data PD. These supplementary process data items can, for example, be used in the comparison of the process data items PD, such as in verifying and checking them. They are therefore fed into the service life monitoring unit 39 together with the process data items PD. In addition, the service life monitoring unit 39 obtains items of wind farm model data, WPM. These are, for example, data about the size and geometric arrangement of the wind farm and about the position of the wind turbine 3 concerned within the wind farm, but also items of data about the main wind direction, and many other matters. In addition, data can be obtained from external sensors 41, for example from wind masts, external temperature sensors and lightning detectors. Taking into account preferably all of these items of data, the service life monitoring unit 39 deduces the stress indicator value BI for the subassembly 1.

Figure 6:
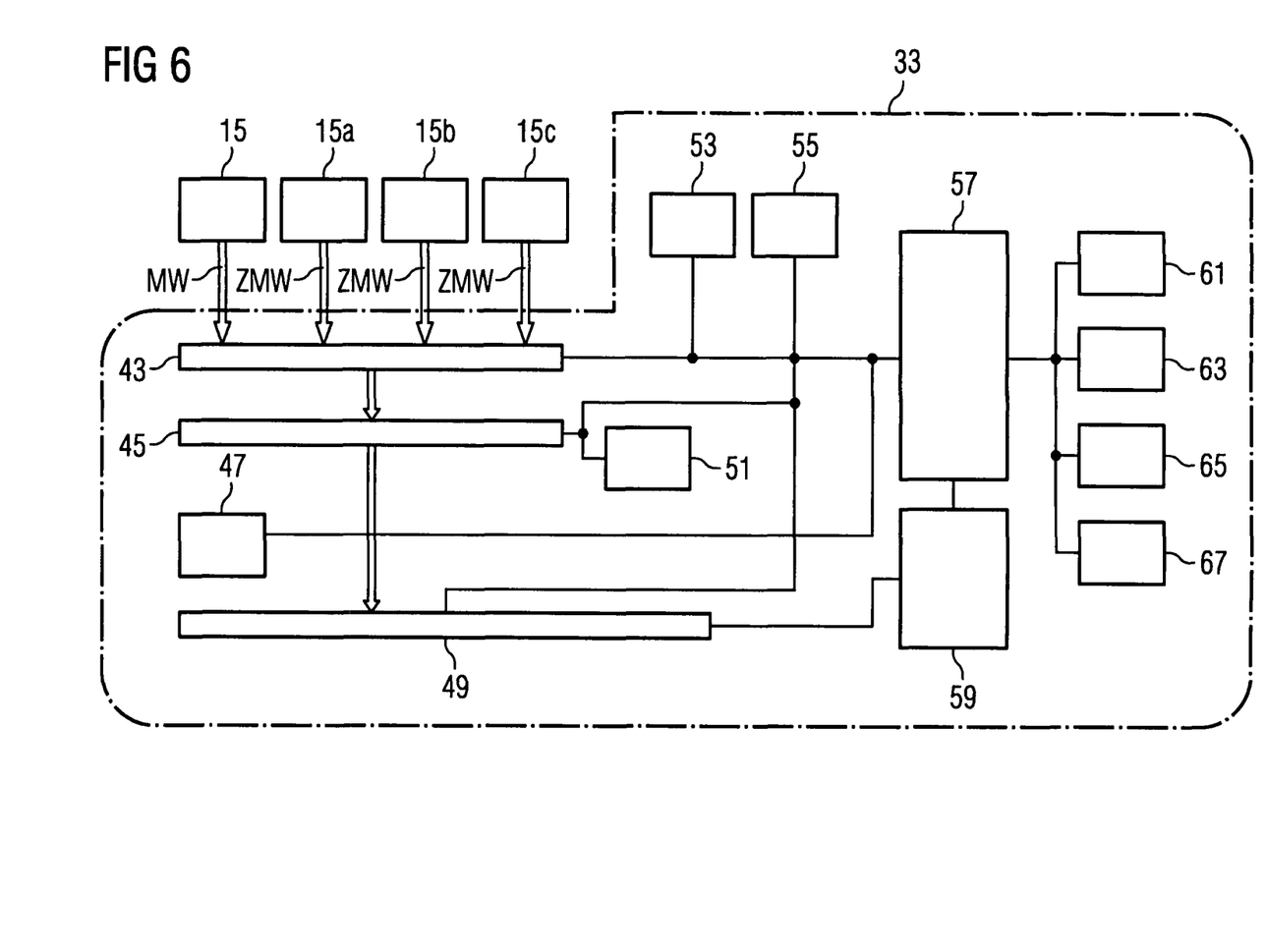

FIG. 6 shows a schematic block diagram of a signal process as part of a form of embodiment of the inventive method.

The sensors 15, 15a, 15b, 15c in FIG. 5 feed their measured values MW, ZMW into the evaluation module 33. In the present case, this is realized as a collection of software modules on a processor. These software modules are:

A first time buffer 43 and a second time buffer 45, a prediction unit 47 and a back-projection unit 51, a 10-minute timer 53, a danger recognition unit 55, a danger sign collection unit 49 and a danger sign evaluation unit 59, together with a classification unit 57 and four damage reporting units 61, 63, 65, 67.

The measured values MW, ZMW from the sensors 15, 15a, 15b, 15c are collected together in the first time buffer 43 and then forwarded on a uniform cycle. By this means, it is possible to compensate for differences in the cycle times of the individual sensors 15, 15a, 15b, 15c. In the second time buffer, the collected measurement values from the previous cycle are collected together and in the back projection unit 51 are evaluated for the purpose of projecting a measured state at the point in time when the previous clock pulse was output. On the basis of the measured values MW, ZMW held available in the first time buffer 43 and in the second time buffer 45, the prediction unit 47 produces a forecast of roughly what measured values are to be expected at the time of the next clock pulse.

The 10-minute timer 53 collects all the measured values MW, ZMW over a time period of 10 minutes and then passes them on collectively to the signal transmitter 19 for onward transmission to the control center (cf. FIG. 1). The danger recognition unit 55 recognizes acute dangers, for example a heating up of the subassembly 1 or a technical fault which, for example, will lead to the operation of the entire wind turbine 3 being switched off in order to avoid consequential damage. On the other hand, the danger sign collection unit 49 is used in combination with the danger sign evaluation unit 59 for collecting "softer" danger signs, and evaluating their frequency and, if appropriate, other symptoms. Thus, a one-time exceeding of certain temperature values does not represent an acute danger, but the frequent occurrence of such values can give notice that the subassembly 1 or other units in the wind turbine 3 has or have a fault. In the classification unit 57, the measured values MW, ZMW together with items of data from the danger recognition unit 55 and the danger sign evaluation unit 59 are collected and, using the evaluation algorithm already described above, the remaining service life of the subassembly 1 is determined. The four damage reporting units 61, 63, 65, 67 are used to report particular types of damage, such as for example overheating, an operating fault, an excessive vibration or the reaching of a critical remaining service life for the subassembly 1. All the items of data generated can be passed on to the control center via the 10-minute timer 53.

In closing, attention is again called to the fact that the method described in detail above and the systems presented are solely exemplary embodiments which, without departing from the scope of the invention, can be modified in the widest variety of ways by a specialist. Furthermore, the use of the indefinite article "a" does not exclude the possibility of the features concerned being multiply present. In addition, "units" can consist of one or more components, even having a spatially distributed arrangement.

The invention claimed is:

1. A method for adjusting the stress on an electrical and/or electronic subassembly in a wind turbine, the method comprising:
   determining for the electrical and/or electronic subassembly an expected service life up to the point when a maintenance indicator value is reached, which represents a state of the subassembly at which, on the basis of conditions defined in advance, the subassembly should be maintained,
   comparing the expected service life against the time point for the next maintenance of the wind turbine, and
   controlling said wind turbine and/or at least one other wind turbine in an area around the wind turbine as a function of a result of the comparing of the expected service life against the time point for the next maintenance of the wind turbine, the controlling effective to reduce the stress on the electrical and/or electronic subassembly.

2. The method as claimed in claim 1, wherein the determination of the expected service life comprises:
   determining a present stress indicator value for the electrical and/or electronic subassembly,
   comparing the present stress indicator value against the maintenance indicator value, and
   deducing the expected service life on the basis of the relationship between the stress indicator value and the maintenance indicator value.

3. The method as claimed in claim 1, wherein the determination of the expected service life and the control actions are repeated in a closed control loop until the stress on the electrical and/or electronic subassembly is reduced so far that the expected service life is extended at least up until the time point of the next maintenance.

4. The method as claimed in claim 1, wherein the wind turbine is so controlled that the position of a rotor of the wind turbine relative to a present wind direction, and/or the position of at least one rotor blade of the rotor, is adjusted in such a way that the rotor reaches a speed of rotation which is less than the maximum possible under the wind conditions.

5. The method as claimed in claim 1, wherein the at least one other wind turbine is selectively oriented relative to the wind turbine so that the wind turbine is sheltered into a lee of the at least one other wind turbine.

6. The method as claimed in claim 1, wherein a present stress indicator value is determined on the basis of temperature measurements in the area around the electrical and/or electronic subassembly.

7. The method as claimed in claim 6, wherein the temperature measurements are carried out over the entire usage cycle of the subassembly in the wind turbine and reference values are derived and accumulated from the temperature measurements and the stress indicator value is formed on the basis of the accumulated reference values.

8. The method as claimed in claim 7, wherein the reference values are based on temperature cycles in a curve of temperature against time, determined from the temperature measurements.

9. The method as claimed in claim 7, wherein the reference values are based on maxima and/or minima of a curve of temperature against time, determined from the temperature measurements.

10. The method as claimed in claim 7, wherein the reference values are defined on the basis of over- and/or undershoots of temperature threshold values defined in advance.

11. The method as claimed in claim 6, wherein the temperature measurements are made by at least one temperature sensor which is attached at a position, which is fixed relative to the subsystem, in the neighborhood of the subsystem.

12. The method as claimed in claim 1, wherein a present stress indicator value is determined on the basis of determination results from at least one of the following methods of determination from the group consisting of:

measurement of a salt content in the air in the region of the wind turbine, determination of wind profiles at the wind turbine and/or upwind of it, temperature measurement on electrical equipment on the other wind turbine, current fault measurements on the electrical and/or electronic subassembly, and vibration measurements on a drive train and/or a generator in the wind turbine.

13. The method as claimed in claim 1, wherein the relationship between a present stress indicator value and a maintenance indicator value is output to a user in graphical form, preferably with the assistance of a scale and/or a graphic encoding.

14. The method as claimed in claim 1, wherein the electrical and/or electronic subassembly comprises a converter.

15. A computer program product which can be loaded directly into a processor of a programmable stress adjustment system, with program code configured to carry out the steps of a method in accordance with claim 1 when the program product is executed on the stress adjustment system.

16. A system for adjusting the stress on an electrical and/or electronic subassembly in a wind turbine, the system comprising:

a determination unit which, in operation, determines for the electrical and/or electronic subassembly an expected service life up to the point when a maintenance indicator value is reached, which represents a state of the subassembly at which, on the basis of conditions defined in advance, the subassembly should be maintained, a comparison unit, which is so designed that it compares the expected service life against the time point for the next maintenance of the wind turbine, and a control unit which controls the wind turbine and/or at least one other wind turbine in the area around the wind turbine as a function of a result of the comparison of the expected service life against the time point for the next maintenance of the wind turbine, the control by the control unit effective to reduce the stress on the electrical and/or electronic subassembly.

17. The system as claimed in claim 16, wherein the electrical and/or electronic subassembly comprises a converter.

\* \* \* \* \*